United States Patent
Leonard

(10) Patent No.: US 12,256,037 B2
(45) Date of Patent: Mar. 18, 2025

(54) SYSTEM AND METHOD FOR IMPROVED AUTOMOTIVE SAFETY

(71) Applicant: John F. Leonard, Haddonfield, NJ (US)

(72) Inventor: John F. Leonard, Haddonfield, NJ (US)

( * ) Notice: Subject to any disclaimer, the term of this patent is extended or adjusted under 35 U.S.C. 154(b) by 371 days.

(21) Appl. No.: 17/895,698

(22) Filed: Aug. 25, 2022

(65) Prior Publication Data

US 2024/0040032 A1 Feb. 1, 2024

Related U.S. Application Data

(60) Provisional application No. 63/393,328, filed on Jul. 29, 2022.

(51) Int. Cl.
| | | |
|---|---|---|
| *H04M 1/72463* | (2021.01) | |
| *B62D 1/04* | (2006.01) | |
| *H04M 1/72454* | (2021.01) | |
| *H04W 4/40* | (2018.01) | |
| *H04W 4/80* | (2018.01) | |

(52) U.S. Cl.
CPC ...... *H04M 1/724631* (2022.02); *B62D 1/046* (2013.01); *H04M 1/72454* (2021.01); *H04W 4/40* (2018.02); *H04W 4/80* (2018.02)

(58) Field of Classification Search
CPC ....... H04M 1/724631; H04M 1/72454; H04M 1/6075; H04M 1/724098; H04M 1/72463; B62D 1/046; H04W 4/40; H04W 4/80
See application file for complete search history.

(56) References Cited

U.S. PATENT DOCUMENTS

| | | | |
|---|---|---|---|
| 8,706,143 B1 * | 4/2014 | Elias | H04M 1/72463 455/1 |
| 8,761,821 B2 | 6/2014 | Tibbitts et al. | |
| 8,787,936 B2 | 7/2014 | Tibbitts et al. | |
| 9,386,447 B2 | 7/2016 | Tibbitts et al. | |
| 9,451,447 B2 | 9/2016 | Tibbitts et al. | |
| 9,615,213 B2 | 4/2017 | Tibbitts et al. | |
| 9,819,789 B2 * | 11/2017 | Moir | H04W 4/80 |
| 10,129,388 B1 * | 11/2018 | Elliott | H04W 4/02 |
| RE47,216 E | 1/2019 | Brown et al. | |
| 10,172,070 B2 | 1/2019 | Tibbitts et al. | |
| 10,326,878 B2 * | 6/2019 | Moir | H04W 4/025 |
| 10,506,091 B2 | 12/2019 | Tibbitts et al. | |
| 11,021,164 B2 | 6/2021 | Tibbitts et al. | |
| 11,533,395 B2 | 12/2022 | Tibbitts et al. | |
| 11,638,198 B2 | 4/2023 | Tibbitts et al. | |
| 11,643,088 B2 | 5/2023 | Tibbitts et al. | |
| 11,751,124 B2 | 9/2023 | Tibbitts et al. | |
| 11,767,020 B2 | 9/2023 | Tibbitts et al. | |

(Continued)

FOREIGN PATENT DOCUMENTS

EP 3544272 A1 * 9/2019

OTHER PUBLICATIONS https ://www. android. com/auto.
International Search Report, Jan. 9, 2023, PCT/US2022/41626.

*Primary Examiner* — Farid Seyedvosoghi
(74) *Attorney, Agent, or Firm* — Gregory J. Winsky

(57) ABSTRACT

A system and method for improved automotive safety, particularly aimed at the prevention of automobile, truck, and other vehicle accidents related to driving in a distracted manner while using a cell phone.

8 Claims, 2 Drawing Sheets

(56) References Cited

U.S. PATENT DOCUMENTS

| | | | |
|---|---|---|---|
| 2008/0214211 A1 | 9/2008 | Lpovski | |
| 2010/0087137 A1* | 4/2010 | Fischer | H04M 1/66 |
| | | | 701/45 |
| 2010/0105356 A1* | 4/2010 | Ghazarian | H04L 51/58 |
| | | | 455/410 |
| 2011/0111724 A1 | 5/2011 | Baptiste | |
| 2013/0295908 A1* | 11/2013 | Zeinstra | H04W 4/40 |
| | | | 455/418 |
| 2017/0053460 A1* | 2/2017 | Hauser | G07C 5/04 |
| 2017/0104865 A1* | 4/2017 | Skelton | H04M 1/6075 |
| 2017/0311109 A1* | 10/2017 | Rodrigs | H04W 4/50 |
| 2019/0141607 A1 | 5/2019 | Tibbitts et al. | |
| 2019/0349470 A1* | 11/2019 | Abramson | H04W 4/48 |
| 2021/0284177 A1 | 9/2021 | Tibbitts et al. | |
| 2021/0394766 A1 | 12/2021 | Crawford et al. | |
| 2022/0159432 A1 | 5/2022 | Crawford et al. | |
| 2022/0219681 A1* | 7/2022 | Mehta | H04W 4/40 |
| 2023/0122082 A1 | 4/2023 | Tibbitts et al. | |

\* cited by examiner

SYSTEM AND METHOD FOR IMPROVED AUTOMOTIVE SAFETY

CROSS REFERENCE TO RELATED APPLICATION

This application claims the benefit of U.S. Provisional Application No. 63/393,328 filed on Jul. 29, 2022.

FIELD OF THE INVENTION

The general field of the instant invention is technology for the improvement of automotive safety, particularly with respect to the use by drivers distracted by their use of cell phones while driving.

BACKGROUND OF THE INVENTION

Texting while driving is well known to cause automotive accidents, many of which end in death. For example, it has been reported that 14% of fatal car crashes involve cell phones. In 2018, over 400,000 people were injured and over 2,800 people died in distracted driving motor vehicle accidents. Tellingly, a full 42% of high school students admitted in 2015 that they text or email during driving, and statistics say that cell phone usage reduces a driver's attention by as much as 37%. (as reported by Children's Hospital of Philadelphia Research Institute) For these statistics and other examples, see: https://www.thezebra.com/resources/research/texting-and-driving-statistics/

While law enforcement measures have been implemented in order to stem the crisis of distracted driving, the crisis continues unabated.

SUMMARY OF THE INVENTION

Presently, the technology available is not sufficient to cure the crisis stated above, much less to prevent individual cases of distracted driving. In addition to the law enforcement efforts stated above, and while some vehicles do not allow the operator to enter navigation requests on the dashboard during driving, the technology as it currently exists does not prevent a driver from distracted driving while using his or her cell phone" vs using the hands free feature. As another example of such limited technology, the program known as Android Auto acts simply to bring apps from a cell phone to the car display so that "you can focus while you drive." Android promises the driver that "you can control features like navigation, maps, calls, text messages, and music." Not only is using Android Auto solely a voluntary choice by a driver, but moreover the program requires a potential user to obtain information about that driver's car's compatibility with Android Auto by contacting the vehicle manufacturer. See generally: https://www.android.com/auto?gclid=Cj0KCQjwz96WBhC8ARIsAATR253-jtig-jaYbZkRHL4ibFQzbib_cwWQ2HzKe-PHjvPFeeTP18vSYS0aAll4EALw_wcB&gclsrc=aw.ds As described herein, the instant invention, once installed, does not provide a driver with a voluntary choice to drive undistracted; rather the instant invention prevents a driver, once installed, from accessing any application programs on a cell phone while driving as described in the preferred embodiment hereinbelow.

DETAILED DESCRIPTION OF THE INVENTION

Figure 1:
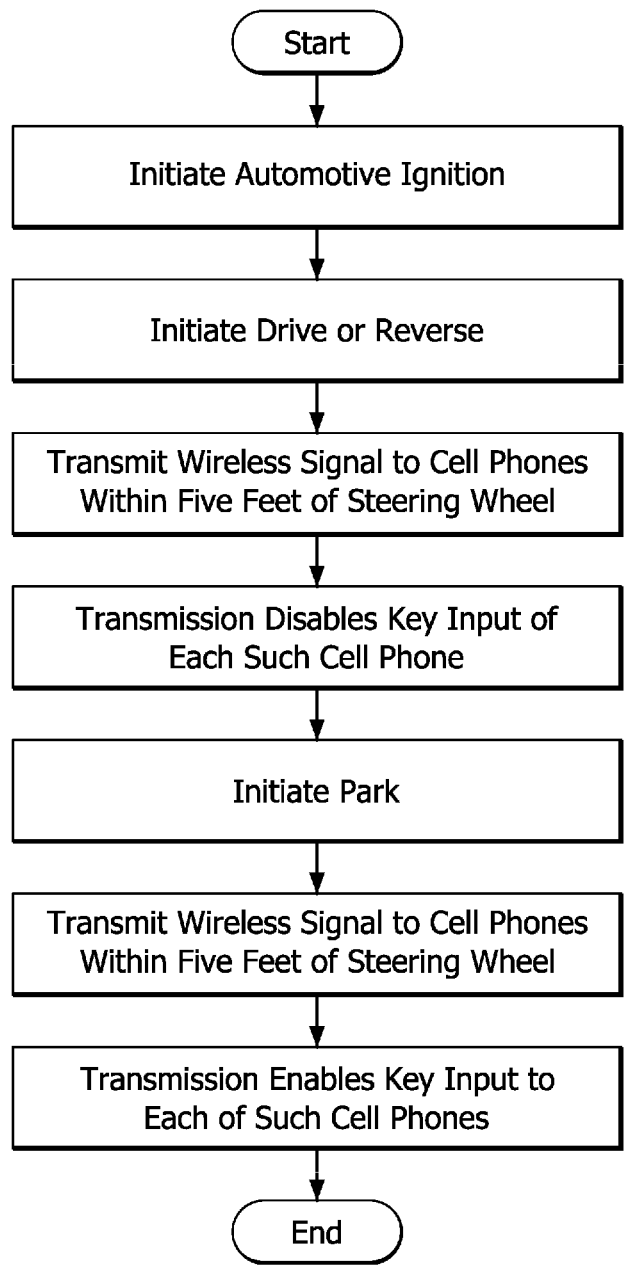
FIG. 1 is a flowchart of the application program that enables the method of the preferred embodiment of the present invention.
Figure 2:
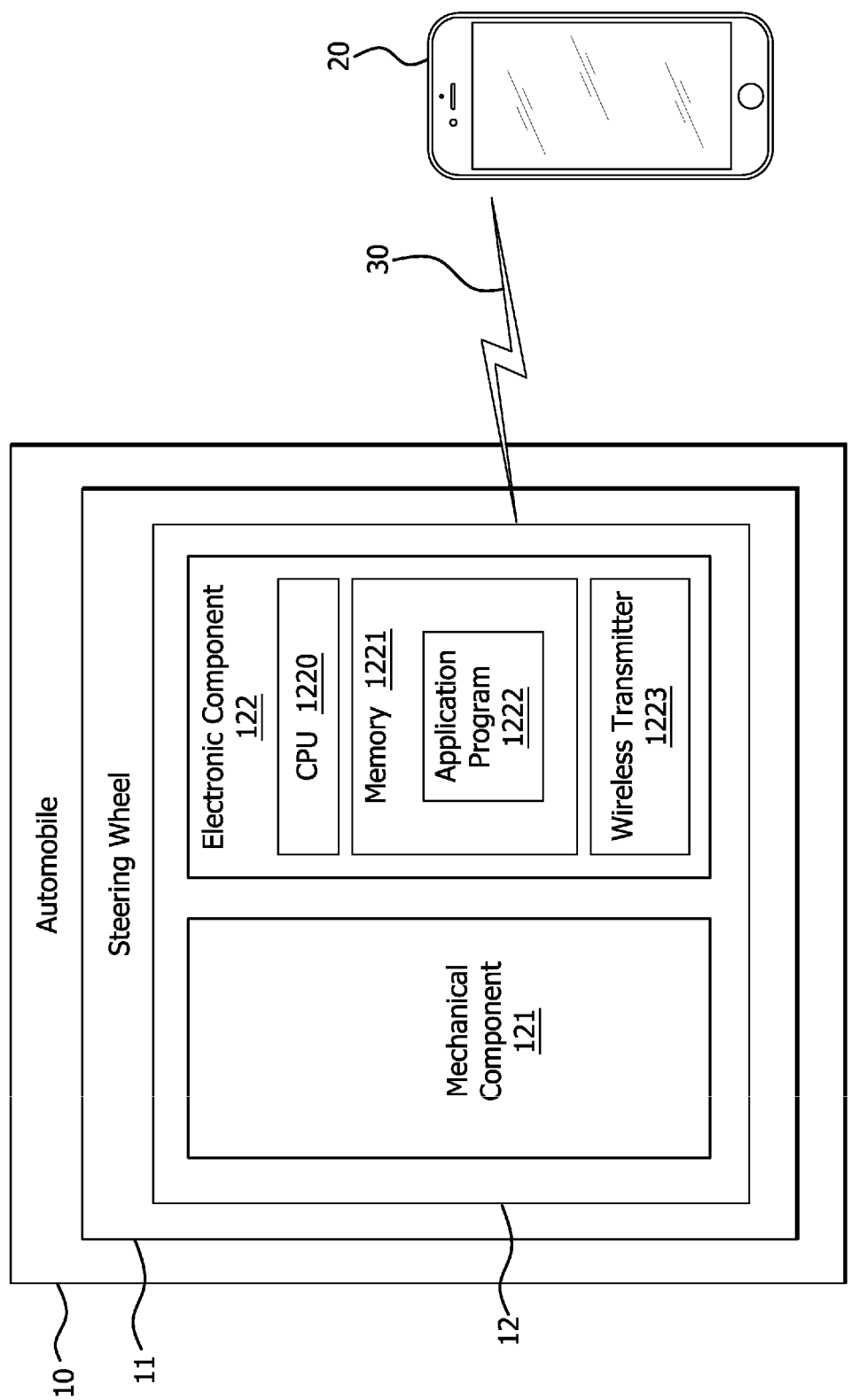
FIG. 2 is a block diagram of the system of the preferred embodiment of the present invention.

Referring to the drawings filed herewith, the flowchart of FIG. 1 sets forth the steps of the software application program 1222 of the instant invention that is shown in the block diagram of the hardware of the preferred embodiment of the disclosed system. FIG. 2 shows an automobile, truck, or bus 10, having a steering wheel 11 in which is constructed an electromechanical device 12, having a mechanical component 121 that identifies movement of vehicle 10, such as an accelerometer, and an electronic component 122 comprised of a CPU 1220, a wireless receiver/transmitter 1223, and a memory 1221 in which is stored an application program 1222. Additionally, FIG. 2 shows a cell phone 20 located within five feet of steering wheel 11 within said vehicle 10, said cell phone being in communication with said electrical component 122 through wireless connection 30. Said communication 30 can be, for example, a Bluetooth wireless link, but this is not a limitation on the breadth to be afforded this invention.

As per the flowchart of FIG. 1, when a driver starts up his or her vehicle, the mechanical component 121 of electromechanical device 12 senses motion of vehicle 10. Mechanical component 121 is outfitted to send an electronic signal to electronic component 122, which signal triggers CPU 1220 to initiate application program 1222 resident in memory 1221 of said electronic component 122. Said application program 1222 causes CPU 1220 to cause wireless transmitter 1223 to send a disabling signal via wireless link 30 to each cell phone 20 located within 5 feet of said steering wheel 11. As said flowchart shows, once PARK is initiated by the driver of vehicle 10 and mechanical component 121 senses a cessation of movement, an electronic signal is sent from said mechanical component 121 to electronic component 122, causing CPU 1220 in coordination with application program 1222 to send a wireless signal via wireless connection 30 to each cell phone 20 within five feet of steering wheel 11 cancelling the disabling signal that was previously sent to each such cell phone 20, allowing the handheld use of said cell phones 20 once again.

What is claimed is:

1. A system for preventing distracted driving of a vehicle by a driver in possession of a cell phone comprising:
   an electromechanical device comprising a mechanical component and an electronic component connected electronically to the output of said mechanical component constructed within said vehicle,
   wherein said mechanical component senses movement of said vehicle and said electronic component transmits a wireless signal to said cell phone on movement of said vehicle, which signal disables the key input function for said cell phone.

2. The system of claim 1 in which said electronic component is comprised of:
   a central processing unit;
   a wireless receiver/transmitter; and
   a memory in which memory is stored an application program.

3. The system of claim 1 in which said mechanical component is an accelerometer.

4. The system of claim 1 in which said wireless signal is a Bluetooth signal.

5. An improvement to an automotive control system for preventing distracted driving of a vehicle by a driver in possession of a cell phone, said improvement comprising:
- an electromechanical device comprising a mechanical component and an electronic component connected electronically to the output of said mechanical component constructed within said vehicle,
- wherein said mechanical component senses movement of said vehicle and said electronic component transmits a wireless signal to said cell phone on movement of said vehicle, which signal disables the key input function for said cell phone.

6. The improvement of claim 5 in which said-electronic component is comprised of:
- a central processing unit;
- a wireless receiver/transmitter; and
- a memory in which memory is stored an application program.

7. The improvement of claim 5 in which said mechanical component is an accelerometer.

8. The improvement of claim 5 in which said wireless signal is a Bluetooth signal.

* * * * *